Patented June 29, 1943

2,323,227

UNITED STATES PATENT OFFICE 2,323,227

PREPARATION OF 2,2,3-TRICHLOROBUTANE

Arthur A. Levine and Oliver W. Cass, Niagara Falls, N. Y., assignors to E. I. du Pont de Nemours & Company, Wilmington, Del., a corporation of Delaware No Drawing. Application October 12, 1938, Serial No. 234,692

1 Claim. (Cl. 260—658)

This invention relates to the preparation of 2,2,3-trichlorobutane and more particularly to a method whereby this compound may conveniently be prepared from 2-chloro-butene-2.

The above trichlorobutane is a mobile, colorless liquid having a reported atmospheric boiling point of 141–143° C. Prior methods of preparing this compound have consisted in the chlorination of mono- or dichlorobutanes, e. g. 2,3-dichlorobutane. These methods of preparation are not especially satisfactory in that the course of chlorination is difficult to control with the result that generally a mixture consisting of various isomeric trichlorobutanes and even higher chlorinated products, results.

It is an object of the present invention to provide an improved method of preparing 2,2,3-trichlorobutane. A further object is the provision of a convenient and practicable method of preparing this compound employing 2-chlorbutene-2 as a raw material, which method is advantageous in that it may be practiced without excessive quantities of undesired chlorinated products being formed. Still further objects will be apparent from the ensuing description of my invention.

The above objects may be accomplished in accordance with the present invention by chlorinating 2-chloro-butene-2 so as to effect addition of chlorine at the double bond. This may be accomplished in the substantial absence of light by either a vapor or liquid phase method, the latter being preferred since it is especially well suited for operation without substantial formation of substitution products. When employing the liquid phase method, it is advantageous to have present in the reaction mixture a chlorination catalyst favoring the addition of chlorine to the double bond. This method when practiced at a suitable temperature results in excellent yields of 2,2,3-trichlorobutane without the formation of excessive quantities of by-product chlorination impurities and is therefore especially well adapted for commercial operation.

When it is desired to avoid as far as possible formation of by-product chlorination impurities, especially substitution chlorinated products, the chlorination should be carried out in the substantial absence of light, especially direct sunlight. Also, in the liquid phase method a catalyst such as ferrous or ferric chloride, stannous or stannic chloride, aluminum chloride, antimony tri- or pentachloride, sulfur or sulfur chloride, or iodine, should be employed. These inorganic substances, all of which contain a halogen in a form which catalyzes the addition of chlorine to the double bond of 2-chloro-butene-2, are especially suitable for use in practicing the liquid phase method. When using such a catalyst, for example ferric chloride or stannic chloride, and when suitable temperature control is exercised, the liquid phase reaction may be carried out to obtain the desired product in good yield without excessive amounts of undesired by-products being formed simultaneously. Other catalysts, such as those which are known generally to catalyze the addition of chlorine to the double bond of olefinic compounds, may also be employed in accordance with our invention, but the catalysts specifically mentioned above are preferred. In the vapor phase modification of the invention, especially at temperatures above about 100° C., there is a tendency for chlorination by substitution to increase.

Temperature control is a highly important factor in determining whether or not chlorination by substitution becomes appreciable, the higher temperatures increasing this type of chlorination. Since low temperature chlorination is most conveniently carried out in the liquid phase, this method is especially well suited for use when substitution chlorinated products are undesirable. We prefer to effect chlorination in the liquid phase at a temperature of 20 to 40° C. However, temperatures as high as the atmospheric reflux temperature of the reaction mixture may be employed, especially when light is completely excluded from the reaction zone. A temperature as low as 0° C. or lower may be used, however, the rate of reaction decreases as the temperature is decreased and becomes too sluggish for practical purposes at such low temperatures. At the preferred temperature the reaction proceeds readily without substantial formation of substitution products. In the vapor phase method, light and temperatures above about 150° C. should be avoided if the formation of relatively large amounts of by-products is to be avoided.

The following example illustrates the preparation of 2,2,3-trichlorobutane in accordance with our invention.

Example

A 500 cc. three-necked flask was equipped with a chlorine inlet, the bottom of which extended to near the bottom of the flask. The flask was also provided with a thermometer, a mercury sealed stirrer, a reflux condenser and an exit tube. The exit tube was connected to a cooling and scrubbing system for retaining any vapors not returned by the condenser and for absorbing any hydrogen chloride that might be formed.

The flask was charged with 259 grams of 2-chlorbutene-2 and 2.6 grams of ferric chloride. After taking the necessary precautions for excluding light, a stream of chlorine was passed into the reaction mixture while the temperature was maintained at 20–30° C. During the course of the reaction an additional 1.25 grams of ferric chloride was added and the rate of chlorine addition was adjusted so that substantially all of the chlorine admitted was absorbed. After a period of 4½ hours the reaction mixture together with material collected in the aforementioned scrubber and cooler, was washed with water, dried with calcium chloride and fractionated through a 30 inch fractionating column. The boiling range of the resulting product showed that only traces of isomeric trichlorobutanes were obtained, the product consisting chiefly of 2,2,3-trichlorobutane, together with unreacted 2-chloro-butene-2 and a small amount of a high boiling residue. The 2,2,3-trichlorobutane isolated by distillation corresponded to a yield of 77% of the theory.

The 2-chloro-butene-2 which serves as raw material in the above method of preparing 2,2,3-trichlorobutane may be obtained from any source, but is conveniently prepared by the method described in our copending patent application Ser. No. 234,691, filed October 12, 1938. According to this method 2,3-dichlorobutane is subjected to the pyrolytic action of heat at a temperature of 200–300° C. in the presence of barium chloride. This vapor phase method of producing 2-chloro-butene-2 is especially useful since the desired product may be obtained thereby without the formation of substantial amounts of isomeric monochloro-butenes.

From the above it is evident that the preferred method of our invention is the liquid phase chlorination in the presence of a suitable catalyst such as ferric chloride or stannic chloride in the substantial absence of light at a temperature of 20 to 40° C. The catalyst concentration may be varied within wide limits. Thus, using ferric chloride, 1 to 5% or more produces excellent results. However, other concentrations may be employed if desired. The reaction mixture of course should be substantially anhydrous, otherwise, hydrolysis of the catalyst will result. Mere traces of water are not objectionable, however, so long as sufficient catalyst is employed to provide an effective amount of unhydrolyzed catalyst in the reaction mixture.

The preparation of 2,2,3-trichlorobutane in accordance with the present method is conveniently carried out at normal pressure, although pressures higher or lower than atmospheric pressure may be employed in accordance with our invention.

Instead of employing substantially pure 2-chlorobutene-2 together with catalyst as the starting reaction medium in the preferred liquid phase method the present invention may be practiced employing in conjunction with such a mixture an inert diluent. The use of such a diluent, for example carbon tetrachloride, may be desirable under some circumstances to moderate the rate of reaction, e. g. when a relatively high reaction temperature is employed. However, in general a diluent is not required since excellent results may be obtained using no diluent.

It is apparent that many widely different modifications of our invention may be practiced without departing from the spirit and scope thereof. It is therefore not intended that the invention be limited except as indicated in the appended claim.

We claim:

The method of preparing 2,2,3-trichlorobutane which comprises chlorinating 2-chloro-butene-2 in the substantial absence of light in the liquid phase at a temperature of 0° C. to the atmospheric reflux temperature of the reaction mixture, in the presence of stannic chloride.

ARTHUR A. LEVINE.
OLIVER W. CASS.